May 23, 1961  F. K. WILLIAMS  2,985,018

VIBRATION WAVE DISTANCE MEASURING DEVICE

Filed Oct. 22, 1956

*INVENTOR.*
FRANK K. WILLIAMS
BY *Lewis L. Humphries*

ATTORNEY

United States Patent Office 2,985,018
Patented May 23, 1961

2,985,018

VIBRATION WAVE DISTANCE MEASURING DEVICE

Frank K. Williams, Woodland Hills, Calif., assignor to North American Aviation, Inc.

Filed Oct. 22, 1956, Ser. No. 617,610

6 Claims. (Cl. 73—398)

This invention relates to distance measuring devices and more particularly to a device for measuring relatively small displacements and providing a continuous indication of the frequency and amplitude of these displacements.

One of the particular problems encountered in present day distance measuring devices is the difficulty of measuring small displacements continuously and accurately. Such a problem occurs specifically in the measurement of vibrations. Here the distance measuring devices must measure small displacements of high frequency with a degree of accuracy which precludes the use of devices which are in contact with the surface of the vibration table. Also, there is an ever-increasing need for devices which measure small movements of a diaphragm such as is included in a pressure transducer.

Measuring distances by producing sonic or supersonic waves and determining the time required for these waves to travel to and return from a reflecting surface is well-known. The time which elapses between the emission of the waves and their reception after reflection can be directly correlated with the distance between the source of the waves and the surface. Using this principle, long distances may easily be estimated. However, because of the interval between the emission of the waves and their reception, relatively short distances are difficult to ascertain. Because of this inherent inability to measure relatively short displacements, present day distance measuring devices are unable to measure distances occurring in such applications as vibration table displacements, pressure measurements and acceleration measurements.

The device of this invention utilizes longitudinal, or compression, waves in a liquid or air medium to measure and continuously record small movements of a reflecting surface. The reflecting surface is attached to the object whose movement is to be measured. Sonic or ultrasonic waves are emitted from a transmitting device, passed through an air or liquid medium, are reflected by the reflecting surface and then received by a receiving device. The transmitting and receiving devices are connected to a phase comparison device which combines instantaneously the wave leaving the transmitter and the wave arriving at the receiver to produce an output signal directly proportional to the distance travelled by the waves. When used to measure the amplitude and frequency of oscillation of a surface, no contact with the surface is necessary. This feature of the device of this invention enables more accurate measurements to be made due to the fact the surface load caused by standard measuring devices produces an appreciable error which is not present in this device. When used as a transducer to measure pressure or acceleration, a relatively minute movement of the diaphragm sensitive to the pressure or acceleration may be indicated.

It is therefore an object of this invention to provide an ultrasonic micrometer.

It is another object of this invention to provide an improved condition measuring device.

It is still another object of this invention to provide an improved distance measuring device.

It is a further object of this invention to provide a system for measuring relatively short distances.

It is a further object of this invention to provide a device which measures amplitude and frequency of an oscillating object.

Other objects of invention will become apparent from the following description taken in connection with the accompanying drawings, in which Fig. 1 is a schematic diagram of the device showing the apparatus employed in the simple embodiment of this invention;

Figure 1:
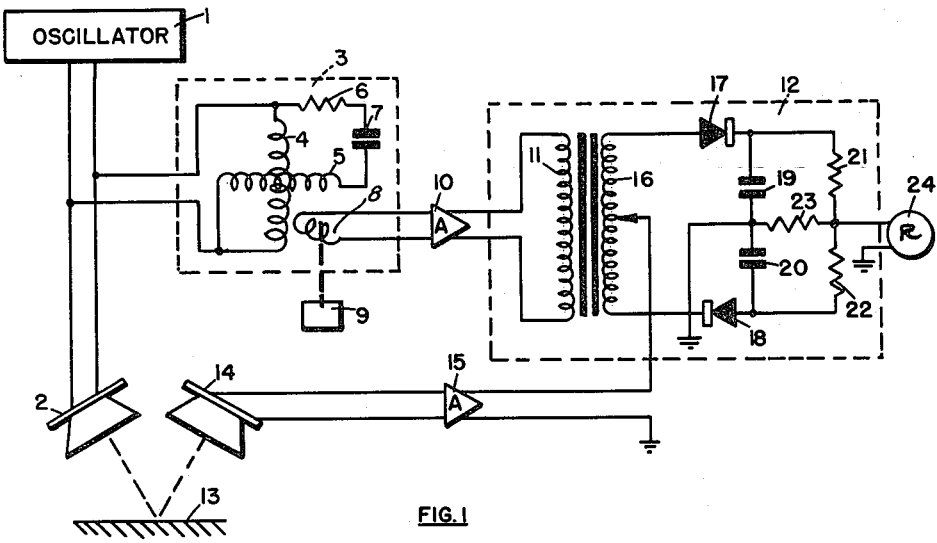
Figure 4:
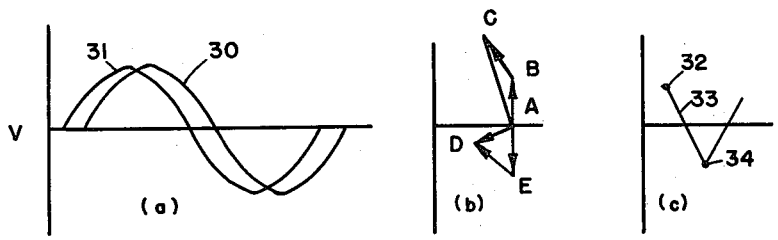

And Fig. 4 is a series of graphs showing the wave forms of the device of Fig. 1 in operation.

Referring to Fig. 1, oscillator 1 furnishes an electric signal of sonic or supersonic frequency to ceramic crystal transmitter 2 and phase shifter 3. Phase shifter 3, as shown, is of the Helmholtz-coil phase-shifting type having vertical coil 4 and horizontal coil 5 comprising the primary circuit and adjustable coil 8 comprising the secondary circuit. Vertical coil 4 is connected across the input signal received from oscillator 2 and horizontal coil 5 is connected in series with resistor 6 and capacitor 7 across the input. The current through vertical coil 4 is 90° out-of-phase with the current through horizontal coil 5, the phase shift being caused by resistor 6 and capacitor 7. This circuit provides a rotating magnetic field when a sine wave signal is received from oscillator 1. The rotating field formed by vertical coil 4 and horizontal coil 5 induces a voltage in adjustable secondary coil 8. The phase relation between the output voltage taken from coil 8 and the input voltage applied to coils 4 and 5 depends upon the physical position in which secondary coil 8 is placed. Coil 8 may be manually adjusted by knob 9 which is attached to physically rotate the coil. The output from coil 8 is amplified by amplifier 10 and presented to primary winding 11 of phase detector 12. Connected to receive the sonic waves emitted by transmitter 2 and reflected by movable surface 13 is ceramic crystal receiver 14. The waves received by receiver 14 are amplified by amplifier 15 and fed into secondary winding 16 of phase detector 12. The output voltage from amplifier 15 is fed into the center of secondary winding 16 while the output voltage from amplifier 10 is fed across primary winding 11. Rectifier 17 and rectifier 18 which are poled in opposite directions are connected in series with resistor 21 and resistor 22 and secondary winding 16 for forming a current path which is connected through resistor 23 to ground. Filter capacitors 19 and 20 are connected in series across secondary winding 16. The output from phase detector 12 is a varying D.-C. signal of reversible polarity flowing through resistor 23 which is connected to the mid point of capacitors 19 and 20 and ground at one end at the other end to recorder 24. It is to be noted that any of the standard well-known circuitry may be substituted for phase shifter 3 and phase detector 12.

Before operation it is necessary to adjust the signals from amplifiers 10 and 15 so that they will be in phase with each other when reflecting surface 13 is at a reference level. In order to do this, phase shift circuit 3 is adjusted by means of knob 9 so that the input from oscillator 1 is shifted in phase by phase shifter 3 to compensate for the difference in time it takes the signal from oscillator 1 to travel through emitter 2 to be reflected by reflecting surface 13 received by receiver 14 and fed to amplifier 15 and the time it takes the signal from oscillator 1 to get to amplifier 10 which normally would be instantaneous. By adjusting secondary coil 8 with knob 9 the output from phase shifter 3 is a signal exactly in phase with the output from receiver 14 and, therefore, with reflecting surface 13 at rest, the input signal applied to primary winding 11 from amplifier 10 is in phase with the input signal applied to secondary winding 16 from amplifier 15. When the signal presented to primary winding 11 is in phase with the signal presented to secondary winding 16, one-half of the induced voltage across winding 16 is added to the charge on capacitor 19 received from primary winding 11 and a like voltage is subtracted from filter capacitor 20. The difference of these two voltages across capacitors 19 and 20 then develops a voltage across resistor 23 through registors 21 and 22. The polarity of the voltage developed across resistor 23 is such that current is flowing in the direction from recorder 24 through resistor 23 to ground. This is represented on recorder 24 as a positive current indication of an amplitude which indicates a zero movement of surface 13.

Assume now the reflecting surface 13 is oscillating at an unknown frequency and unknown amplitude which is to be measured. During the half cycle when reflecting surface 13 moves in the direction closer to transmitter 2 and receiver 14, the time it takes the signal from oscillator 1 to get to receiver 14 and thence to amplifier 15 and secondary winding 16 becomes less than the time it takes the signal to get from oscillator 1 through phase shifter 3 and amplifier 10 to primary winding 11. Thus, the signal arriving at secondary winding 16 is leading in phase the signal arriving at primary winding 11. The voltage from amplifier 15 which is added to the voltage from amplifier 10 across secondary winding 16 still causes an addition of charge to capacitor 19 and a subtraction of charge from capacitor 20 but of less amount than when the voltages from amplifiers 10 and 15 were in phase. The voltages developed across capacitor 19 are simply the peak voltages derived from the addition of the voltages received from amplifier 10 and those received from amplifier 15. The voltage across capacitor 19 is equal to the charge of capacitor 19 minus the charge of capacitor 20 causing a positive voltage to be created across resistor 23. A D.-C. current proportional to the phase difference between the signal arriving at primary winding 11 and the signal at secondary winding 16 goes through resistor 23 and is recorded on recorder 24. When the reflecting surface 13 moves in the direction farther from transmitter 2 and receiver 14 on the other half cycle of its oscillating period, the phase of the signal arriving at secondary winding 16 is lagging that of the signal arriving at primary winding 11. Similar to the operation explained above, but opposite in action, capacitor 20 now receives a greater magnitude charge than the capacitor 19 creating a voltage drop across resistor 23 opposite to that occurring when the signal at secondary winding 16 was leading in phase that of the signal in primary winding 11. This voltage across resistor 23 causes a current flowing into recorder 24 which is opposite in direction to the current flowing when reflecting surface 13 was moving closer to transmitter 2 and receiver 14. Thus, it can be seen that when reflecting surface 13 moves up recorder 24 receives a current in one direction and when reflecting surface 13 moves down recorder 24 receives a current in the opposite direction. Recorder 24 records a D.-C. current directly proportional in magnitude to the distance that reflecting surface 13 is moved and in a direction indicating the direction of movement of reflected surface 13.

Figure 2:
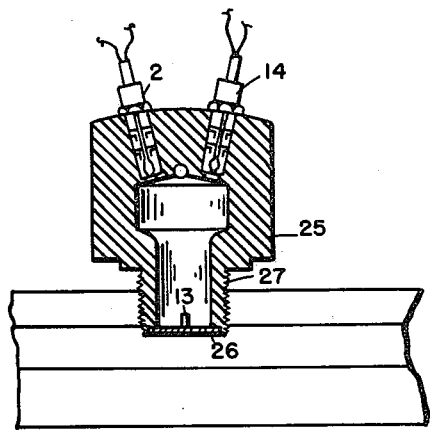
Fig. 2 is an elevation view of the pressure transducer used in another embodiment of this invention.

In Fig. 2 is shown an embodiment of this invention in which transmitter 2, receiver 14 and reflecting surface 13 are enclosed in a pressure transducer. Casing 25 which may be of plastic or metal and diaphragm 26 enclose a pressure sealed chamber filled with liquid and having transmitter 2 and receiver 14 connected through suitable pressure sealed sockets to one end of the sealed chamber and diaphragm 26 attached to the other end to receive the changes in pressure which are applied thereon. Reflecting surface 13 is attached to move with diaphragm 26 and arranged to receive sonic waves emitted by transmitter 2 and reflect these waves to receiver 14. The transducer as shown, has a suitable fitting 27 at one end which allows it to be affixed to a pipe or other device in which pressure may be measured. In operation, diaphragm 26 moving in proportion to the pressure applied thereon causes the distance between reflecting surface 13 and transmitter 2 and receiver 14 to vary. This variable distance is measured by the circuit shown in Fig. 1, and the output at recorder 24 is a D.-C. analog signal directly proportional to measure this distance and calibrated to give a direct indication of the pressure applied to diaphragm 26.

Figure 3:
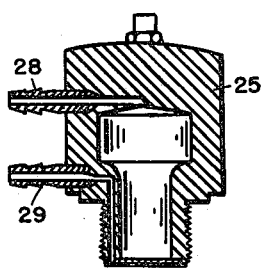
Fig. 3 is a side view of the pressure transducer of Fig. 2 showing in particular the cooling means.

Fig. 3 shows an end view of the transducer of Fig. 2 in which the liquid which fills the sealed chamber is circulated through circulating pipes 28 and 29 which have suitable pressure fittings to maintain a constant pressure in the sealed chambers. By providing a coolant flow in the pressure chamber the pressure transducer may be used at widely variable temperatures and so indicate an accurate measurement in pressure. It can readily be seen that the pressure transducer shown in Figs. 2 and 3 can be modified to indicate other measurements such as force and acceleration.

Fig. 4 is a series of graphs showing the operation of wave form of the circuit of Fig. 1. In Fig. 4a wave form 30 indicates a wave arriving at primary winding 11 and adjusted by phase shafter 3 to be in phase with the wave at receiver 14 when reflector reflecting surface 13 is at rest. Wave form 31 is an indication of the wave form at receiver 14 and secondary winding 16 during the time when reflecting surface 13 has moved closer to transmitter 2 and receiver 14. Wave form 31 is thus leading wave form 30 in phase by an amount proportional to the distance reflecting surface 13 has travelled. Fig. 4b shows in vector relationship the magnitude and direction of the voltages induced in various operating parts of phase detector 12. The voltage vector indicated by AB is that of the voltage arriving at primary winding 11 from oscillator 1 which is wave form 30 of Fig. 4a. The vector BC indicates the direction and magnitude of the voltage arriving at secondary winding 16 from receiver 14 which is that of wave form 31 and is leading in phase the voltage indicated by vector AB. The resultant voltage indicated by the vector AC is the voltage developed across capacitor 19. Similarly, the voltage vector AE equal to the voltage across primary winding 11 and the voltage vector DE equal to the voltage across secondary winding 16 produces a resultant voltage indicated by the vector AD. The vector AD is a measurement of the voltage across capacitor 20. The difference between the voltage across capacitor 19 indicated by the vector AC and the voltage across capacitor 20 indicated by the vector AD becomes a positive D.-C. voltage indicated at recorder 24 and shown in Fig. 4c by point 32. Point 32 indicates the distance that reflecting surface 13 has travelled in the direction of transmitter 2 and receiver 14. As reflecting surface 13 begins to move in the other direction away from transmitter 2 and receiver 14, wave form 31 begins to go from a lead to a lag relationship with wave form 30. Vector AC becomes less than vector AD and the output current at recorder 24 begins to go negative as shown by line 33 in Fig. 4c. This current will continue negative until reflecting surface 13 has reached the opposite end of its cycle at which point indicated by point 34, Fig. 4c, the negative current in recorder 24 is at a maximum. As reflecting surface 13 begins a second cycle moving closer to transmitter 2 and receiver 14, line 33 again moves in a positive direction. This will continue as long as reflecting circuit 13 is oscillating. It is readily apparent from Fig. 4c that the exact amplitude and frequency of the vibrating reflecting surface 13 is measured by recorder 24.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A micrometer comprising means for transmitting and receiving sound waves, oscillator means associated with said transmitting means whereby sound waves are transmitted in a sonic path between said transmitting and receiving means, a sonic reflector in said path and mounted for movement relative to at least one of said transmitting and receiving means so as to alter the length of said sonic path, condition responsive means for moving said reflector in accordance with a condition to be measured, and measuring means responsive to a sonic wave signal transmitted with respect to a predetermined length of path and further responsive to a sonic wave signal transmitted over said altered sonic path, to provide an indication of phase difference in the signals, said phase difference being a function of the distance between said transmitting and receiving means and said reflector.

2. Claim 1 as described wherein said measuring means comprise frequency shift means responsive to said oscillator means to produce a signal of predetermined phase difference from said oscillating means when said sonic reflector is at a predetermined reference point from said transmitting and receiving means, and a phase detector receiving the output of said frequency shift means and said receiving means to produce a signal proportional to the distance between said sonic reflector and said predetermined point, the output of said frequency shift means being in phase with the output of said receiving means when said sonic reflector is at said predetermined point.

3. Pressure indicating means comprising a housing, flexible diaphragm means carried by said housing, said flexible diaphragm means movable relative to said housing in response to pressure, a pair of crystals secured to said housing, one of said crystals electrically responsive to movement of said flexible diaphragm, means for providing a signal of substantially constant frequency to one of said crystals whereby a sonic path exists between said crystals and said flexible diaphragm means, and means for measuring the change in the length of said sonic path to provide an indication of pressure.

4. Claim 3 wherein is included a sonic reflector mounted on said flexible diaphragm, means whereby one of said crystals transmits sonic waves which are reflected by said sonic reflector and received by the other said crystal.

5. Pressure indicating means comprising a housing, a flexible diaphragm attached to one end of said housing, said flexible diaphragm movable relative to said housing in response to a pressure, a sonic reflector mounted on said diaphragm, a transmitter, a receiver, said transmitter and receiver attached to the other end of said housing and within said housing, a source of electrical signals connected to said transmitter whereby said electric signals travel from said transmitter to said sonic reflector and thence to said receiver in a sonic wave path, and means connected to said receiver and responsive to said source of electric signals and to the electric signals received by said receiver to measure the phase difference between the sonic waves traveling from said transmitter and the sonic waves received by said receiver to produce a signal proportional to the distance said flexible diaphragm moves with respect to said housing.

6. Claim 5 as described wherein said housing including means to provide a coolant flow within said housing.

References Cited in the file of this patent

UNITED STATES PATENTS

| | | |
|---|---|---|
| 1,044,502 | Crehore et al. | Nov. 19, 1912 |
| 2,253,975 | Guanella | Aug. 26, 1941 |
| 2,520,297 | Anderson | Aug. 29, 1950 |
| 2,721,975 | Wojciechowski | Oct. 25, 1955 |
| 2,728,902 | White et al. | Dec. 27, 1955 |
| 2,733,597 | Hardy | Feb. 7, 1956 |

FOREIGN PATENTS

| | | |
|---|---|---|
| 1,126,419 | France | July 30, 1956 |